(12) United States Patent
Akkawi et al.

(10) Patent No.: US 7,613,882 B1
(45) Date of Patent: Nov. 3, 2009

(54) FAST INVALIDATION FOR CACHE COHERENCY IN DISTRIBUTED SHARED MEMORY SYSTEM

(75) Inventors: Isam Akkawi, Aptos, CA (US); Michael Woodacre, Sutton Benger SN15 4RX (GB); Bryan Chin, San Diego, CA (US); Krishnan Subramani, San Jose, CA (US); Najeeb Imran Ansari, San Jose, CA (US); Chetana Nagendra Keltcher, Sunnyvale, CA (US); Janakiramanan Vaidyanathan, San Jose, CA (US)

(73) Assignee: 3 Leaf Systems, Santa Clara, CA (US)

( * ) Notice: Subject to any disclaimer, the term of this patent is extended or adjusted under 35 U.S.C. 154(b) by 454 days.

(21) Appl. No.: 11/668,275

(22) Filed: Jan. 29, 2007

(51) Int. Cl.
*G06F 12/08* (2006.01)
*G06F 15/163* (2006.01)

(52) U.S. Cl. .................. 711/124; 709/214; 711/141

(58) Field of Classification Search .................. None
See application file for complete search history.

(56) References Cited

U.S. PATENT DOCUMENTS

| 5,706,463 | A | 1/1998 | Ebrahim |
| 6,490,661 | B1 | 12/2002 | Keller |
| 7,107,408 | B2 | 9/2006 | Glasco |
| 7,360,069 | B2 * | 4/2008 | Steely et al. ............... 712/228 |
| 7,366,847 | B2 * | 4/2008 | Kruckemyer et al. ....... 711/144 |
| 7,389,389 | B2 * | 6/2008 | Gharachorloo et al. ...... 711/145 |

FOREIGN PATENT DOCUMENTS

EP    1008940 A2    6/2000

OTHER PUBLICATIONS

Acacio, M.E., J. Gonzalez, J.M. Garca and J. Duato, "Owner Prediction for Accelerating Cache-to-Cache Transfer Misses in a cc-NUMA Architecture", 0-7695-1524-X/02, IEEE 2002, 12 pages.*
Brock, B.C. et al., "Experience with Building a Commodity Intel-based ccNUMA System", IBM Journal of Research and Development, vol. 45, No. 2 (2001).

* cited by examiner

*Primary Examiner*—Gary J Portka
(74) *Attorney, Agent, or Firm*—Baker Botts L.L.P.

(57) ABSTRACT

An example embodiment of the present invention provides processes relating to a cache coherence protocol for distributed shared memory. In one process, a DSM-management chip receives a request to modify a block of memory stored on a node that includes the chip and one or more CPUs, which request is marked for fast invalidation and comes from one of the CPUs. The DSM-management chip sends probes, also marked for fast invalidation, to DSM-management chips on other nodes where the block of memory is cached and responds to the original probe, allowing the requested modification to proceed without waiting for responses from the probes. Then the DSM-management chip delays for a predetermined time period before incrementing the value of a serial counter which operates in connection with another serial counter to prevent data from leaving the node's CPUs over the network until responses to the probes have been received.

20 Claims, 9 Drawing Sheets

*Data could include any message that is bearing data, including interrupts.

FAST INVALIDATION FOR CACHE COHERENCY IN DISTRIBUTED SHARED MEMORY SYSTEM

TECHNICAL FIELD

The present disclosure relates to caches for shared memory in a distributed computing network and coherence protocols for such caches.

BACKGROUND

Symmetric Multiprocessing (SMP) is a multiprocessor system where two or more identical processors are connected, typically by a bus of some sort, to a single shared main memory. Since all the processors share the same memory, the system appears just like a "regular" desktop to the user. SMP systems allow any processor to work on any task no matter where the data for that task is located in memory. With proper operating system support, SMP systems can easily move tasks between processors to balance the workload efficiently. Consequently, SMP has many uses in science, industry, and business, where software is specially programmed for multi-threaded processing.

In a bus-based system, a number of system components are connected by a single shared data path. To make a bus-based system work efficiently, the system ensures that contention for the bus is reduced through the effective use of memory caches (e.g., line caches) in the CPU which exploit the concept, called locality of reference, that a resource that is referenced at one point in time will be referenced again sometime in the near future. However, as the number of processors rise, CPU caches fail to provide sufficient reduction in bus contention. Consequently, bus-based SMP systems tend not to comprise large numbers of processors.

Distributed Shared Memory (DSM) is a multiprocessor system that allows for greater scalability, since the processors in the system are connected by a scalable interconnect, such as an InfiniBand switched fabric communications link, instead of a bus. DSM systems still present a single memory image to the user, but the memory is physically distributed at the hardware level. Typically, each processor has access to a large shared global memory in addition to a limited local memory, which might be used as a component of the large shared global memory and also as a cache for the large shared global memory. Naturally, each processor will access the limited local memory associated with the processor much faster than the large shared global memory associated with other processors. This discrepancy in access time is called non-uniform memory access (NUMA).

A major problem in DSM systems is ensuring that the each processor's memory cache is consistent with each other processor's memory cache. Such consistency is called cache coherence. A statement of the sufficient conditions for cache coherence is as follows: (a) a read by a processor, P, to a location X that follows a write by P to X, with no writes of X by another processor occurring between the write and the read by P, always returns the value written by P; (b) a read by a processor to location X that follows a write by another processor to X returns the written value if the read and write are sufficiently separated and no other writes to X occur between the two accesses, and (c) writes to the same location are serialized so that two writes to the same location by any two processors are seen in the same order by all processors. For example, if the values 1 and then 2 are written to a location, processors do not read the value of the location as 2 and then later read it as 1.

Bus sniffing or bus snooping is a technique for maintaining cache coherence which might be used in a distributed system of computer nodes. This technique requires a cache controller in each node to monitor the bus, waiting for broadcasts which might cause the controller to change the state of its cache of a memory block. Typically, the states for a memory block in a cache include "dirty" (or "modified"), "valid" ("owned" or "exclusive"), "shared", and "invalid". It will be appreciated that the parenthesized states are often referred to as the states of the MOESI (Modified Owned Exclusive Shared Invalid) coherence protocol. See U.S. Pat. No. 5,706,463. On a read miss by a node (e.g., a request to load data), the node's cache controller broadcasts, via the bus, a request to read a block and the cache controller for the node with a copy of the block in the state "dirty" changes the block's state to "valid" and sends a copy of the block to the requesting node. On a write miss by a node (e.g., a request to store data), the node's cache controller transitions the block into a "valid" state and broadcasts a message, via the bus, to the other cache controllers to invalidate their copies of the block. Once the node has written to the block, the cache controller transitions the block to the state "dirty". Since bus snooping does not scale well, larger distributed systems tend to use directory-based coherence protocols.

In directory-based protocols, directories are used to keep track of where data, at the granularity of a cache block, is located on a distributed system's nodes. Every request for data (e.g., a read miss) is sent to a directory, which in turn forwards information to the nodes that have cached that data and these nodes then respond with the data. A similar process is used for invalidations on write misses. In home-based protocols, each cache block has its own home node with a corresponding directory located on that node.

To maintain cache coherence in larger distributed systems, additional hardware logic (e.g., a chipset) or software is used to implement a coherence protocol, typically directory-based, chosen in accordance with a data consistency model, such as strict consistency. DSM systems that maintain cache coherence are called cache-coherent NUMA (ccNUMA). Of course, directory-based coherence protocols and data consistency models introduce latency into the system, which might severely degrade performance, if not properly managed within the overall system design. In this regard, see European Patent Application Ser. No. EP1008940A2 and U.S. Pat. No. 7,107,408, as well as M. E. Acacio, J. Gonzlez, J. M. Garca, and J. Duato, Owner Prediction for Accelerating Cache-to-Cache Transfers in a cc-NUMA Architecture (in Proceedings of SC2002).

Advanced Micro Devices has created a server processor, called Opteron, which uses the x86 instruction set and which includes a memory controller as part of the processor, rather than as part of a northbridge or memory controller hub (MCH) in a logic chipset. The Opteron memory controller controls a local main memory for the processor. In some configurations, multiple Opterons can use a cache-coherent HyperTransport (ccHT) bus, which is somewhat scalable, to "gluelessly" share their local main memories with each other, though each processor's access to its own local main memory uses a faster connection. One might think of the multiprocessor Opteron system as a hybrid of DSM and SMP systems, insofar as the Opteron system uses a form of ccNUMA with a bus interconnect.

SUMMARY

In particular embodiments, the present invention provides methods, apparatuses, and systems directed to reducing the latency of cache coherency in a DSM system. In one particular embodiment, the present invention provides a coherence protocol that allows for fast invalidation of a block of memory cached by computer nodes or the CPUs that comprise a node, through the use of a DSM-management chip.

DESCRIPTION OF EXAMPLE EMBODIMENT(S)

The following example embodiments are described and illustrated in conjunction with apparatuses, methods, and systems which are meant to be examples and illustrative, not limiting in scope.

An Example Distributed Shared Memory Network

Figure 1:
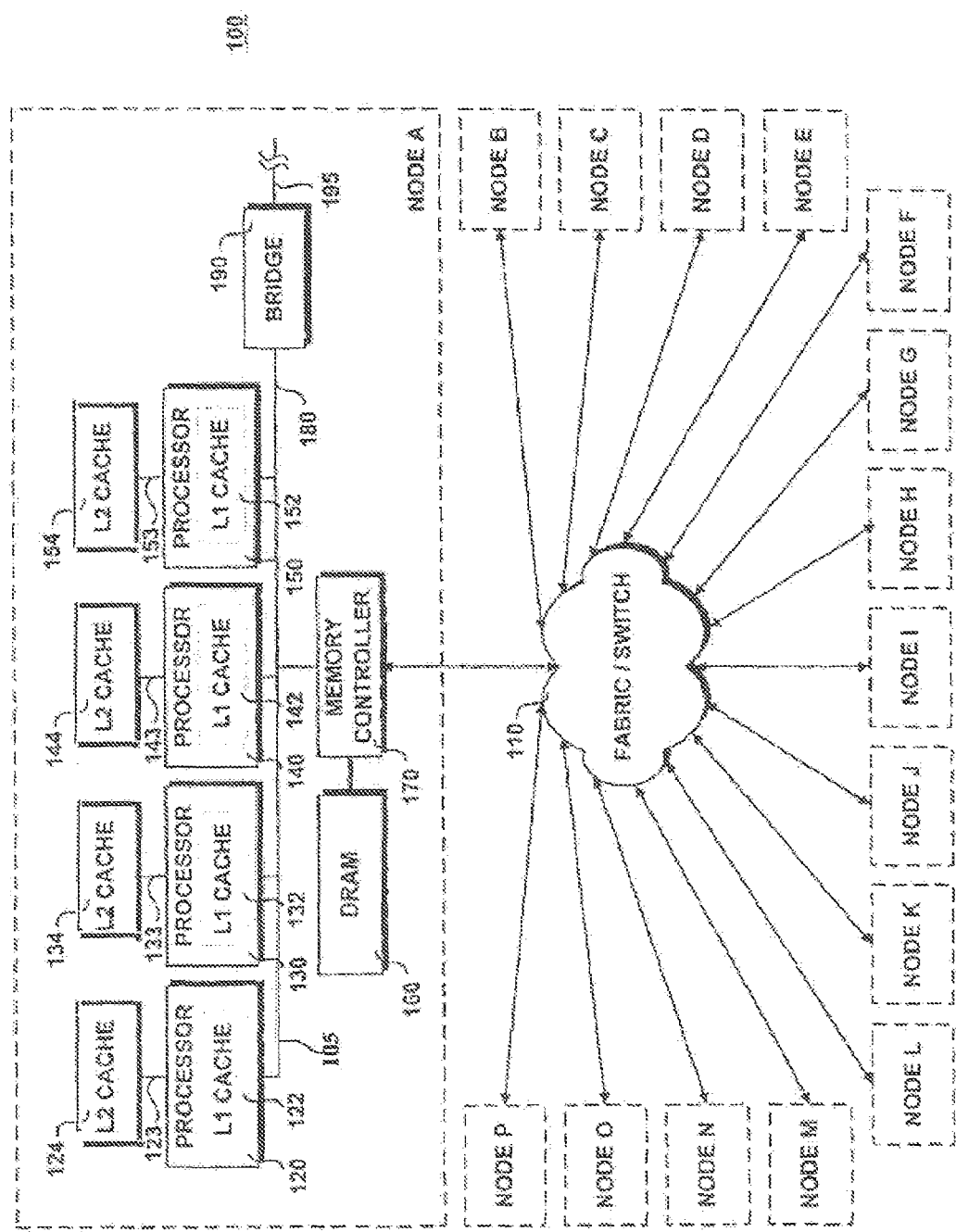
FIG. 1 is a block diagram showing an example of a DSM system comprising multiple compute nodes interconnected by a fabric/high speed switch, which system might be used with an embodiment of the present invention.

As discussed in the background above, DSM systems connect multiple processors with a scalable interconnect or fabric in such a way that each processor has access to a large shared global memory in addition to a limited local memory, giving rise to non-uniform memory access or NUMA. FIG. 1 is a diagram showing an example of a DSM system based on the NUMA model. As shown there, a multi-node, multi-processor computer system 100 includes a plurality of nodes (16 nodes are shown in FIG. 1) A through P coupled to a fabric/high speed switch 110. The fabric/high speed switch 110 transports data packets between the nodes A through P and may also perform additional functions to enhance performance of the system 100, including the maintenance of cache coherence. In this regard, see B. C. Brock, G. D. Carpenter, E. Chiprout, M. E. Dean, P. L. De Backer, E. N. Elnozahy, H. Franke, M. E. Giampapa, D. Glasco, J. L. Peterson, R. Rajamony, R. Ravindran, F. L. Rawson, R. L. Rockhold, and J. Rubio, Experience With Building a Commodity Intel-based ccNUMA System, IBM Journal of Research and Development, Volume 45, Number 2 (2001), pp. 207-227. Alternatively, cache coherence in this system might be maintained by hardware logic in the memory controller 170, as described in further detail below, or through a combination of the fabric/high speed switch 110 and the memory controller 170. In any case, the DSM system described in FIG. 1 might employ the processes for cache coherence described below, in particular embodiments.

Each of the nodes A through P may include one or more processors 120, 130, 140 and/or 150, memory 160 and, in one embodiment, a memory controller 170 coupled to one another by a bus 180. As discussed below, nodes A through P may incorporate different system architectures. For ease of illustration and reference, however, only the structure of node A is shown in FIG. 1, it being understood that nodes B through P may include identical or similar structures. Reference numeral 180 designates the processor/memory bus. A plurality of processors may be attached to the processor/memory bus 105, such as processors 120, 130, 140 and 150. An L1 (Level 1) cache memory 122, 132, 142 and 152 may be integrated within each of the processors 120, 130, 140 and 150, respectively. Each of the processors 120, 130, 140 and 150 may also have an L2 cache memory coupled thereto, such as shown at reference numbers 124, 134, 144 and 154, respectively. The L2 (Level 2) caches may reside, for example, on the processor, on a processor/memory bus, or oil a proprietary backside bus, such as shown at 123, 133, 143 and 153. The L1 caches 122, 132, 142 and 152, as well as the L2 caches 124, 134, 144 and 154, shown in dashed lines in FIG. 1, may be omitted or may be structured differently than shown in FIG. 1.

Referring now specifically to node A (for ease of description only), a memory controller 170 is also connected to the processor/memory bus 105. The memory controller 170 controls the memory coupled to node A and controls the memory input/output (I/O) functions to and from the fabric/switch 110 and node A. The memory controller 170 responds to all transactions from local processors such as processors 120, 130, 140 and 150 and to all transactions received from other nodes via the fabric/high speed switch 110. Toward that end, the memory controller 170, according to the present invention, includes an interface to the processor/memory bus 180, to allow the processors 120, 130, 140 and/or 150 to communicate with memory and with other processors resident in nodes B through P. A bridge 190 may interconnect the processor/memory and system I/O buses 105, 195. The system I/O bus 195 may be implemented as a PCI bus, for example, or some other bus architecture. A number of devices (not shown) may be connected to the system I/O bus 195, such as displays, one or more mass storage devices and/or other devices. Alternatively, these I/O devices and I/O busses may be connected through the fabric/high speed switch 110.

In this generalized example, the processors 120, 130, 140 and 150, as well as their counterparts in nodes B through P communicate via shared memory, although other forms, such as message based communication, may be concurrently operative. The shared memory collectively available to the nodes A through P may be quite large and may be logically divided between each of the nodes A through P. For example, the total amount of shared memory within the multi-node multi-processor system 100 may be about 1024 Gbytes. In this illustrative example, each memory controller 170 may be mapped to and control about one sixteenth (1/16) of that 1024 Gbyte memory space, or about 64 Gbytes. The memory controller 170 may control memory including the Dynamic Random Access Memory (hereafter "DRAM") 160, although other memory types may be utilized. The DRAM 160 in each of the nodes A through P may, therefore, include a fractional portion of the total physical shared memory space on the system 100, such as, for example, about 64 Gbytes in a 1024 Gbyte shared memory system.

B. ccNUMA Network with DSM-Management Chips

Figure 2:
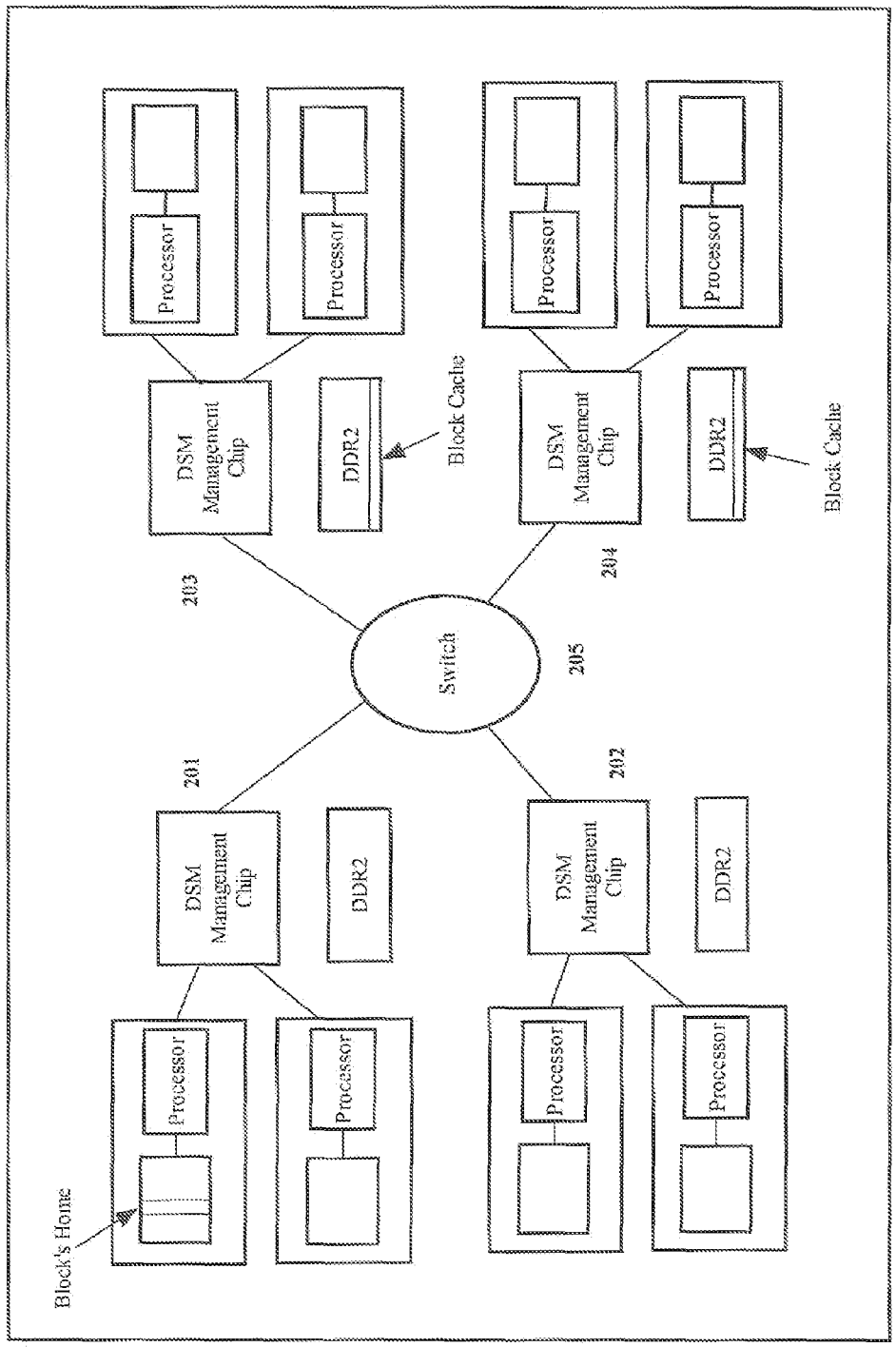
FIG. 2 is a block diagram showing a DSM system, which system might be used with some embodiments of the present invention.

FIG. 2 is a diagram showing a DSM system, which system might be used with particular embodiments of the invention. In this DSM system, four nodes (labeled 201, 202, 203, and 204) are connected to each other over a switched fabric communications link (labeled 205) such as InfiniBand or Ethernet. FIG. 2 also illustrates that the nodes may include a different system architecture. Specifically, in the implementation shown in FIG. 2, each of the four nodes includes two processors, a DSM-management chip, and memory in the form of DDR2 SDRAM (double-data-rate two synchronous dynamic random access memory). In turn, each processor includes a local main memory connected to the processor. In some particular implementations, the processors may be Opteron processors offered by Advanced Micro Devices, Inc. of Sunnyvale, Calif. The present invention, however, may be implemented in connection with any suitable processors.

As shown in FIG. 2, a block of memory has its "home" in the local main memory of one of the processors in node 201. That is to say, this local main memory is where the system's version of the block of memory is stored, regardless of whether there are any cached copies of the block. Such cached copies are shown in the DDR2s for nodes 203 and 204. As will be explained in further detail below, the DSM-management chip includes hardware logic to make the DSM system cache-coherent (e.g., ccNUMA) when multiple nodes are caching copies of the same block of memory.

C. System Architecture of a DSM-Management Chip

Figure 3:
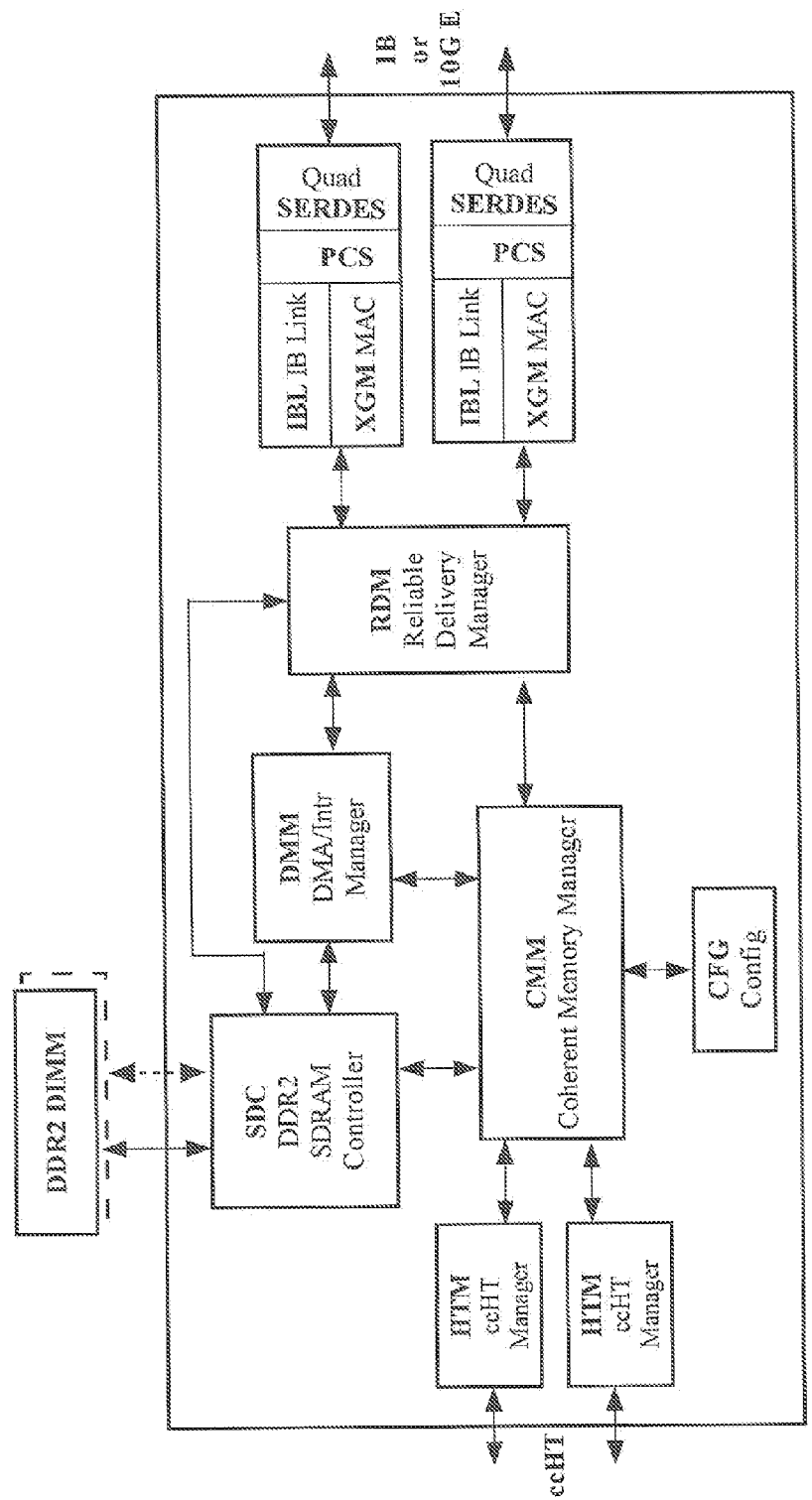
FIG. 3 is a block diagram showing some of the physical and functional components of an example DSM-management logic circuit or chip, which logic circuit might be used as part of a node with some embodiments of the present invention.

FIG. 3 is diagram showing the physical and functional components of a DSM-management chip, which chip might be used as part of a node with particular embodiments of the invention. The DSM-management chip includes interconnect functionality facilitating communications with one or more processors. As FIG. 3 illustrates, the DSM-management chip, in some implementations, includes two HyperTransport Managers (HTM), each of which manages communications to and from an Opteron processor over a ccHT bus as is shown in FIG. 2. More specifically, an HTM provides the PHY and link layer functionality for a cache coherent HyperTransport interface (ccHT). The HTM captures all received ccHT packets in a set of receive queues per interface (e.g., posted/non-posted command, request command, probe command and data) which are consumed by the Coherent Memory Manager (CMM). The HTM also captures packets from the CMM in a similar set of transmit queues per interface and transmits those packets on the ccHT interface. As a result of the two HTMs, the DSM-management chip becomes a coherent agent with respect to any bus snoops broadcast over the ccHT bus by an Opteron memory controller. Of course, other inter-chip or bus communications protocols can be used in implementations of the present invention.

As shown in FIG. 3, the two HTMs are connected to a Coherent Memory Manager (CMM), which provides cache-coherent access to memory for the nodes that are part of the DSM fabric. In addition to interfacing with the Opteron processors through the HTM, the CMM interfaces with the switch fabric, in one implementation, using a reliable transport layer protocol implementation, such as the RDM. (Reliable Delivery Manager). The processes for cache coherence described below might be executed by the CMM in particular embodiments. Additionally, the CMM provides interfaces to the HTM for DMA (Direct Memory Access) and configuration.

The RDM manages the flow of packets across the DSM-management chip's two fabric interface ports. The RDM has two major clients, the CMM and the DMA Manager (DMM), which initiate packets to be transmitted and consume received packets. The RDM ensures reliable end-to-end delivery of packets, in one implementation, using a protocol called Reliable Delivery Protocol (RDP). Of course, other delivery protocols can be used. On the fabric side, the RDM interfaces to the selected link/MAC (XGM for Ethernet, IBL for Infini-Band) for each of the two fabric ports. In particular embodiments, the fabric might connect nodes to other nodes as shown in FIG. 2. In other embodiments, the fabric might also connect nodes to virtual I/O servers. For a further description of virtual I/O servers, see U.S. patent application Ser. No. 11/624,542, entitled "Virtualized Access to I/O Subsystems", and U.S. patent application Ser. No. 11/624,573, entitled "Virtual Input/Output Server", both filed on Jan. 18, 2007, which are incorporated herein by reference for all purposes.

The DSM-management chip may also include Ethernet communications functionality. The XGM, in one implementation, provides a 10G Ethernet MAC function, which includes framing, inter-frame gap handling, padding for minimum frame size, Ethernet FCS (CRC) generation and checking, and flow control using PAUSE frames. The XGM supports two link speeds: single data rate XAUI (10 Gbps) and double data rate XAUI (20 Gbps). The DSM-management chip, in one particular implementation, has two instances of the XGM, one for each fabric port. Each XGM instance interfaces to the RDM, on one side, and to the associated PCS, on the other side.

Other link layer functionality may be used to communicate coherence and other traffic of the switch fabric. The IBL provides a standard 4-lane TB link layer function, which includes link initialization, link state machine, CRC generation and checking, and flow control. The IBL block supports two link speeds, single data rate (8 Gbps) and double data rate (16 Gbps), with automatic speed negotiation. The DSM-management chip has two instances of the IBL, one for each fabric port. Each IBL instance interfaces to the RDM, on one side, and to the associated Physical Coding Sub-layer (PCS), on the other side.

The PCS, along with an associated quad-serdes, provides physical layer functionality for a 4-lane InfiniBand SDR/DDR interface, or a 10G/20G Ethernet XAUI/10GBase-CX4 interface. The DSM-management chip has two instances of the PCS, one for each fabric port. Each PCS instance interfaces to the associated IBL and XGM.

The DMM shown in FIG. 3 manages and executes direct memory access (DMA) operations over PDP, interfacing to the CMM block on the host side and the RDM block on the fabric side. For DMA, the DMM interfaces to software through the DmaCB table in memory and the on-chip DMA execution and completion queues. The DMM also handles the sending and receiving of RDP interrupt messages and non-RDP packets, and manages the associated inbound and outbound queues.

The DDR2 SDRAM Controller (SDC) attaches to a single external 240-pin DDR2 SDRAM DIMM, which is actually external to the DMS-management chip, as shown in both FIG. 2 and FIG. 3. The SDC provides SDRAM access for two clients, the CMM and the DMM.

In some embodiments, the DSM-management chip might comprise an application specific integrated circuit (ASIC), whereas in other embodiments the chip might comprise a field-programmable gate array (FPGA). Indeed, the logic encoded in the chip could be implemented in software for DSM systems whose requirements might allow for longer latencies with respect to maintaining cache coherence, DMA, interrupts, etc.

D. System Architecture of a CMM Module

When a node in a particular embodiment needs data that is resident on another node, the node will request a cacheable block of memory that includes the data from the data's home node. When the cacheable block of memory is returned to the requesting node for use by one of the node's processors, the block will also be cached on its home node. Thereafter, in order maintain cache coherency, the home node's DSM-management chip will monitor probes on that node for the data which was exported. For this monitoring, the DSM-management chip maintains a set of export tags that is used to track the home (or local) memory that was exported to other nodes. In a similar fashion, the DSM-management chip will monitor accesses to remote memory made by the node. For this monitoring, the DSM-management chip maintains a set of import tags that is used to track the remote memory that was imported by this node from other nodes.

Figure 4:
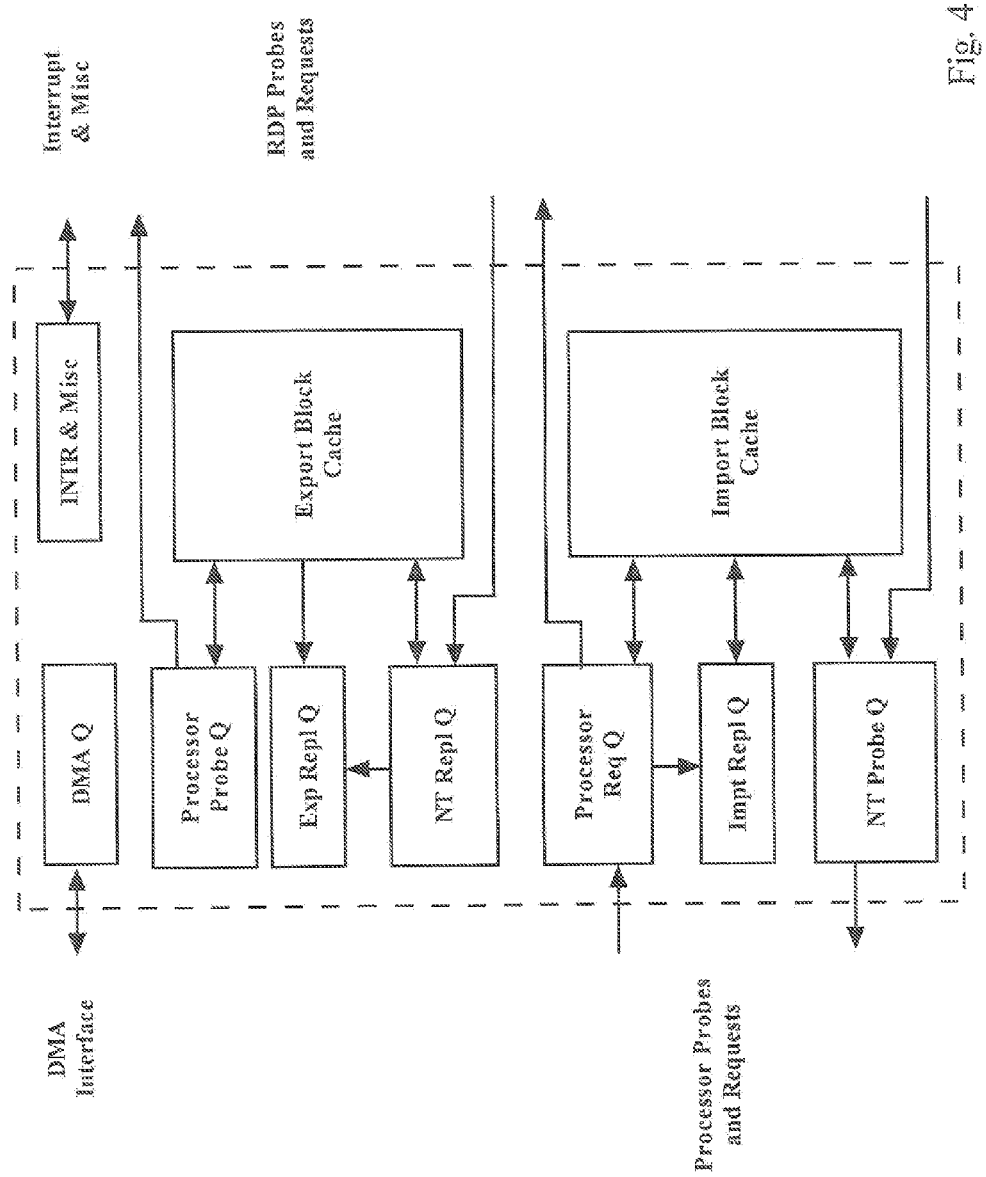
FIG. 4 is a block diagram showing some of the functional components of an example coherent memory manager (CMM) in a DSM-management chip, which chip might be used as part of a node with some embodiments of the present invention.

FIG. 4 is a diagram showing the functional components of a CMM in particular embodiments. In FIG. 4, the CMM includes an Export Block Cache which holds cached export tags (e.g., block identifiers and state) and an Import Block Cache which holds cached blocks of memory with import tags.

Also as shown in FIG. 4, the CMM may have a number of queues: (1) a Processor Request Queue (Processor Req Q) which holds requests to remote address space from the processors on the CMM's node; (2) an Import Replacement Queue (Impt Repl Q) which holds remote cache blocks that need to be written back to their home node due to capacity limitations on import cache (capacity evictions), (3) a Network Probe Queue (NT Probe Q) which holds network probes from home nodes across the network to the remote address space that is cached on this node; (4) a Processor Probe Queue (Processor Probe Q) which holds probes directed to the node's home (or local) memory address space from the processors on the node, (5) a Network Request Queue (NT Req Q) which holds network requests from remote nodes accessing the node's home (or local) address space; (6) an Export Replacement Queue (Expt Repl Q) which holds home (or local) blocks being recalled due to a capacity limitations on export cache (capacity recalls); (7) a DMA Queue (DMA Q) which interfaces the DMM with the processors' bus; and (8) an Interrupt and Miscellaneous Queue (INTR & Misc Q) which interfaces the Interrupt Register Access and other miscellaneous requests with the processors' bus.

F. Processes for Fast Invalidation of a Cached Block of Memory

In some embodiments, the CMM behaves like both a processor cache on a cache-coherent (e.g., ccHT) bus and a memory controller on a cache-coherent (e.g., ccHT) bus, depending on the scenario. In particular, when a processor on a node performs an access to a home (or local) memory address, the home (or local) memory will generate a probe request that is used to snoop the caches of all the processors on the node. The CMM will use this probe to determine if it has exported the block of memory containing that address to another node and may generate DSM probes (over the fabric) to respond appropriately to the initial probe. In this scenario, the CMM behaves like a processor cache on the cache-coherent bus.

When a processor on a node performs an access to a remote memory, the processor will direct this access to the CMM. The CMM will examine the request and satisfy it from the local cache, if possible, and, in the process, generate any appropriate probes. If the request cannot be satisfied from the local cache, the CMM will send a DSM request to the remote memory's home node to (a) fetch the block of memory that contains the requested data or (b) request a state upgrade. In this case, the CMM will wait for the DSM response before it responds back to the processor. In this scenario, the CMM behaves like a memory controller on the ccHT bus.

Figure 5:
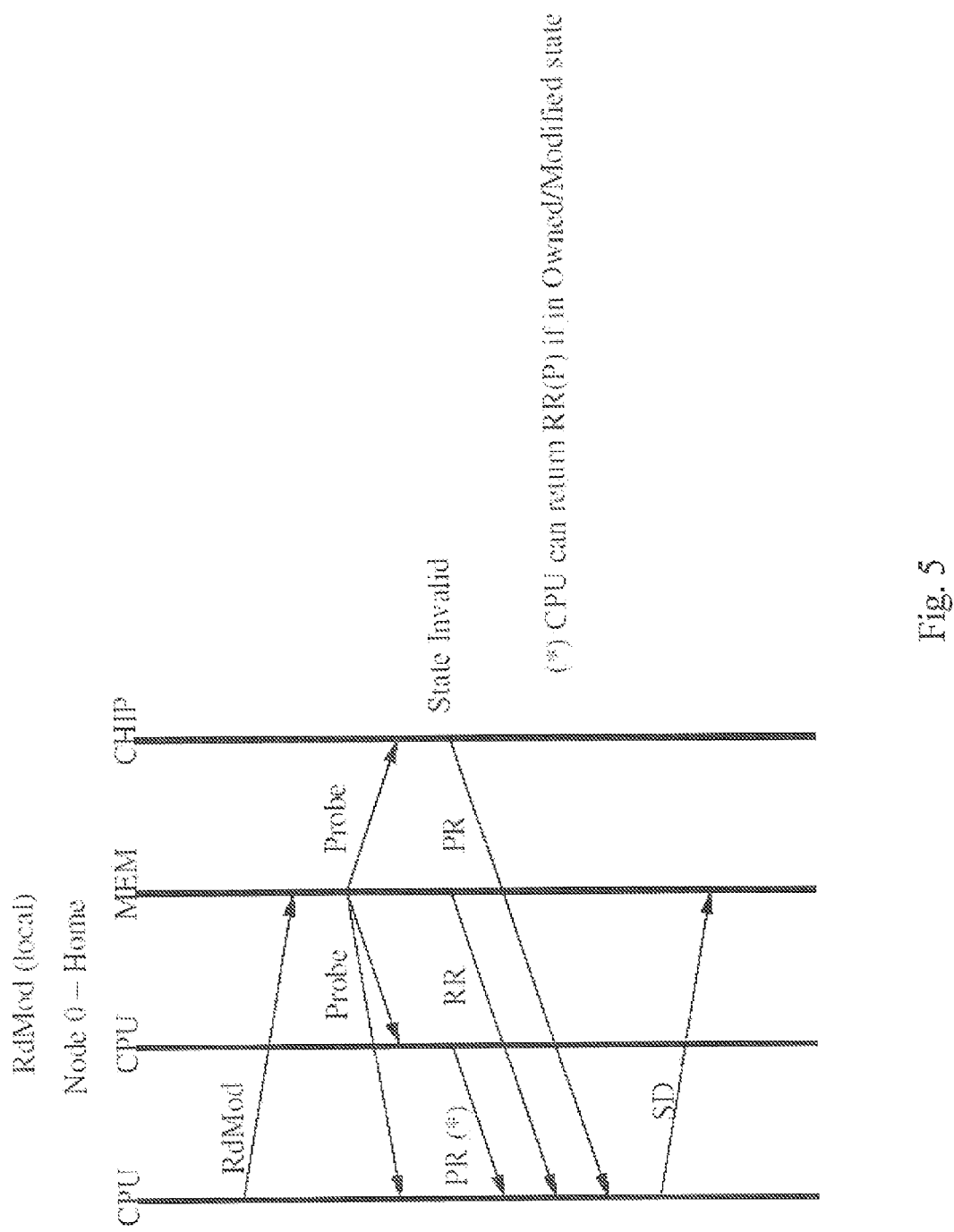
FIG. 5 is a sequence diagram showing an example coherence protocol for a read-modification request for a home (or local) block of memory that is "shared" in a remote cache, which protocol might be used with some embodiments of the present invention.

FIG. 5 is a sequence diagram showing a coherency protocol for a CPU read-modification request that involves a cache block from home (or local) memory that is "Shared" in a remote cache, which protocol might be used with some embodiments of the present invention. In the first step of the sequence, one of the CPUs in the home (or local) node issues a read-modification (e.g., RdBlkMod in the ccHT protocol used by Opteron microprocessors and described in U.S. Pat. No. 6,490,661) message to an address in memory on that node. In the second step of the sequence, the home (or local) memory (MEM) sends probes to the two CPUs on the node and to the node's DSM-management chip. Then in the third step, the other (non-requesting) CPU sends a ProbeResp (or a RdResponse), with the probe bit set and with the data, if the CPU was the "Owned/Modified" CPU. In the fourth step, the DSM-management chip sends Probe_R2Expt messages (with the data bit not set, next state set to "invalid", and the response count to the number of probes) to all of the remote nodes that have a "Shared" copy of the block of memory in their caches. Probe_R2Expt is a message in the RDP protocol described earlier. In the fifth step, MEM sends a RdResp to the CPU with the cache block data. In the sixth step, the remote nodes send a PrbResp__2Expt (an RDP message) back to the DSM-management chip. The state of the block in the DSM-management chip changes to "Invalid". Then in step 7, the DSM-management chip sends a ProbeResp to the CPU and, in step 8, the CPU sends a "done" (e.g., SrcDone in the ccHT protocol) message back to MEM to complete the sequence. Though some examples above use the ccHT bus protocol, it will be appreciated that other cache-coherence bus protocols might have been used.

In particular embodiments, the DSM-management chip might send the ProbeResp (the seventh step) earlier in the sequence (e.g., after the fourth step) if the DSM-management chip can guarantee the appropriate exclusivity and order described in detail below. Such an early response is called a fast invalidation (FI).

Figure 6:
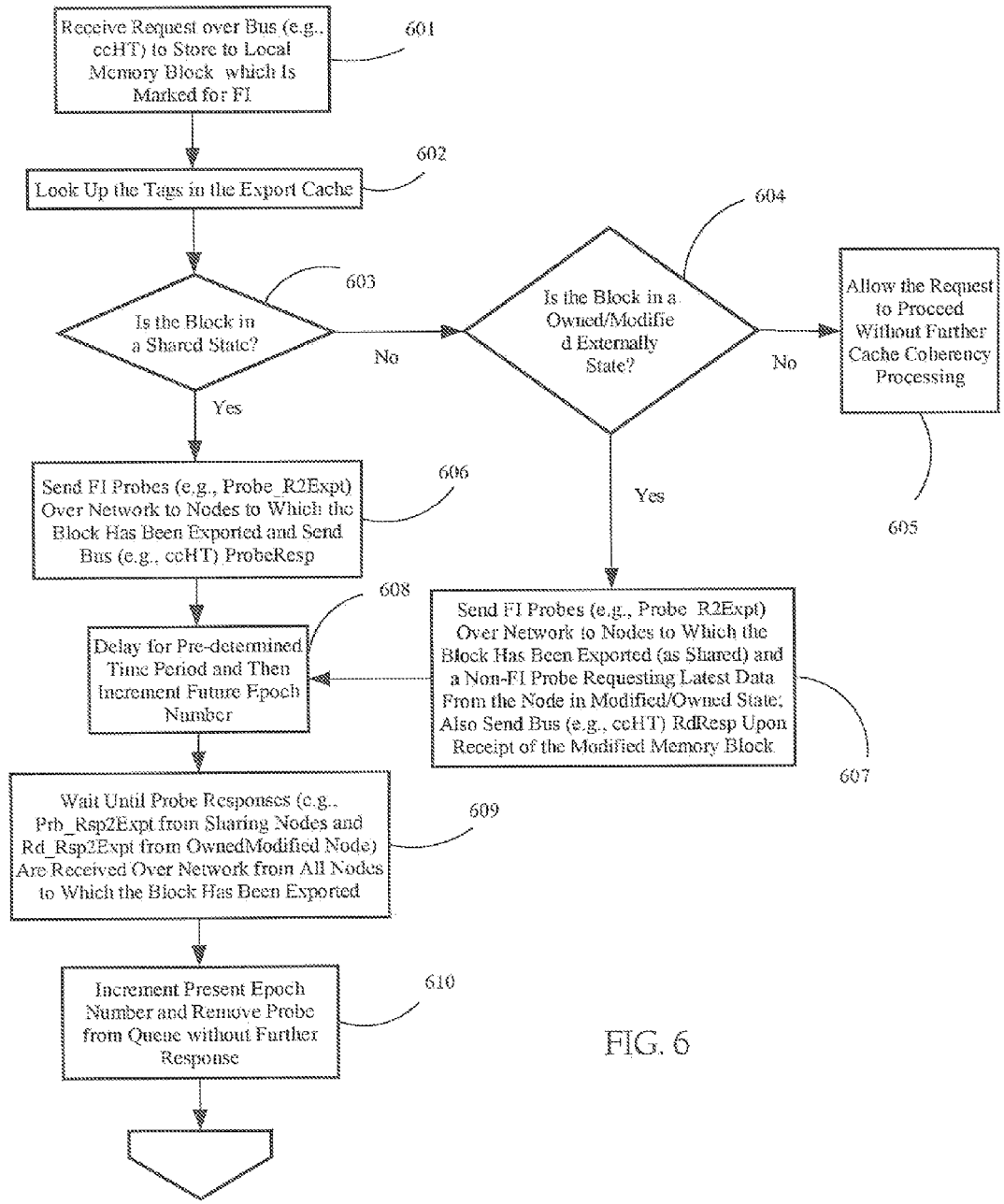
FIG. 6 is a diagram showing a flowchart of an example process for entry into and exit from lockdown or egress ordering by a requesting node during fast invalidation (FI) of an exported block of memory, which process might be used with an embodiment of the present invention.

FIG. 6 is a flowchart of a process for entry into and exit from lockdown or egress ordering by a requesting node during fast invalidation of an exported block of memory, which process might be used with an embodiment of the present invention. The process shown involves a request to store data on a block of memory, which request originates in the node that exports the block of memory. Such a request is referred to as a local store.

The CMM performs lockdown or egress ordering because data in the requesting CPU's memory system has moved ahead in time with respect to the memory systems on other nodes. Consequently, if data in the requesting CPU's memory system were allowed to "leak" out to the other nodes' memory systems before those systems requested the data (by processing the FI), there might be a violation of the third sufficient condition for cache coherence as described above.

In the first step 601, the CMM receives a request over the processors' bus (e.g., ccHT) to store to a local block of memory which has been previously marked for fast invalidation, possibly by a software component of the DSM system in particular embodiments. The CMM then performs a lookup with respect to the block's export tags, in step 602. The CMM determines, in step 603, whether the block of memory is in a "shared" state. If so, the CMM goes to step 606 and sends (i) FI probes (e.g., Probe_R2Expt) over the network to the nodes to which the block of memory has been exported, and (ii) a bus (e.g., ccHT) ProbeResp, without waiting for responses from the network FI probes. The bus ProbeResp allows the store to proceed without additional latency. Otherwise, if the block of memory is not in a "shared" state, the CMM determines, in step 604, whether the block is in a "owned/modified externally" state. If so, the CMM goes to step 607 and sends (i) FI probes (e.g., Probe_R2Expt) over the network to the nodes to which the block of memory has been exported as "shared", (ii) a non-FI probe requesting the latest data for the block from the node in the "owned/modified" state, and (iii) a bus (e.g., ccHT) RdResp upon receipt of the modified version of the block of memory, without waiting for responses from the network FI probes. Here again, the RdResp allows the store to proceed without additional latency. Otherwise, if the block of memory is not in a "owned/modified externally" state, the CMM allows the store request to proceed without further cache coherency processing, in step 605. Following steps 606 and 607, the CMM goes to step 608, where the CMM delays for a pre-determined time and then increments the value of a future epoch number. Then in step 609, the CMM waits until responses (e.g., Prb_Rsp2Expt from "sharing" nodes and Rd_Rsp2Expt form the Owned/Modified node) have been received from all the nodes to which the block of memory has been exported and, in step 610, increments the value of the present epoch number and removes the probe from the queue without further response. Though some examples above use the ccHT bus protocol, it will be appreciated that other cache-coherence bus protocols might have been used.

In step 608 of the process shown in FIG. 6, there is a delay for a pre-determined time period. This pre-determined time period is based on the time it would take for the bus (e.g., ccHT) ProbeResp to reach a CPU in the node and for that CPU to execute a store. In particular implementations, this is a calculated time period that depends upon factors such the bus's capabilities and requirements and the bus's messaging protocol. During this pre-determined time period, there is no lockdown with respect to bus data leaving the node over the network. In many, if not most, instances, there will be no explicit lockdown since responses from all the nodes will be received before the end of the pre-determined time period.

Step 608 of the process increments a future epoch number and step 610 of the process increments a present epoch number. An epoch number is a serially increasing sequence number that is monotonic (or order-preserving) except in the case of rollover. The future epoch number is used to tag data arriving through an interface, e.g., the ccHT bus, in step 701 in FIG. 7 below and the network in step 901 in FIG. 9 below. The present epoch number acts as a gate which prevents any data belonging to a future epoch from leaving the DSM-management chip over an interface, e.g., the network in step 704 in FIG. 7 below and the ccHT bus in step 904 in FIG. 9 below. Some embodiments might use other types of serial counters in place of epoch numbers, as will be appreciated by those skilled in the art.

Figure 7:
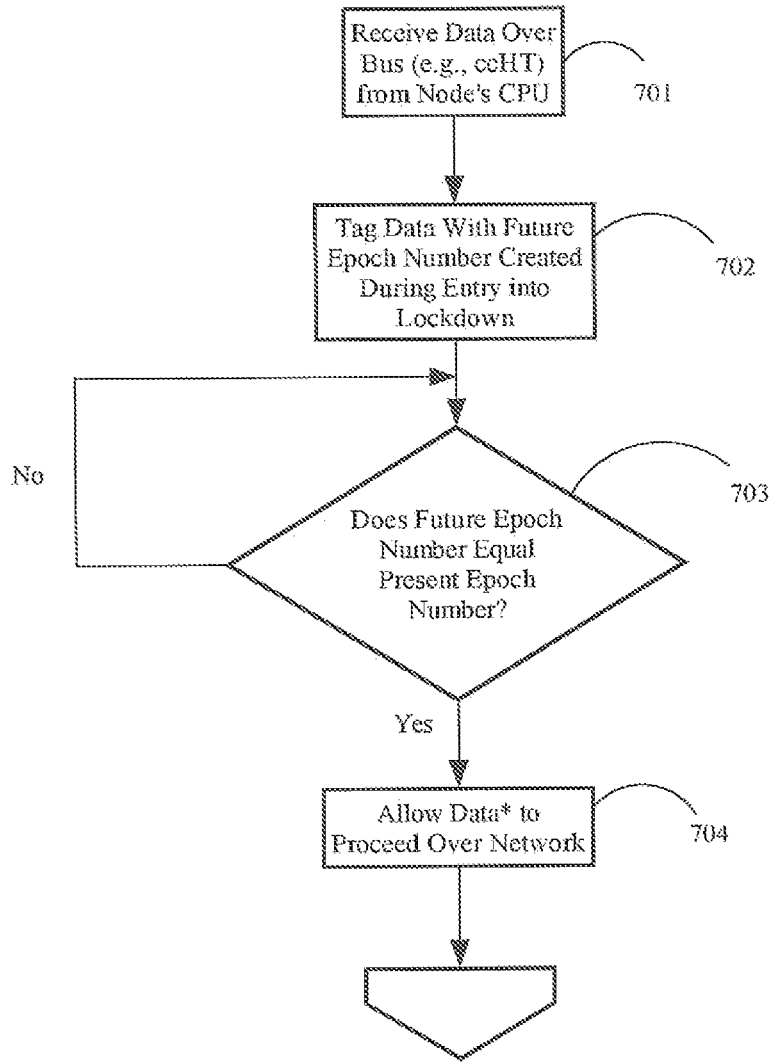
FIG. 7 is a diagram showing a flowchart of an example process for enforcing lockdown or egress ordering by a requesting node during fast invalidation of an exported block of memory, which process might be used with an embodiment of the present invention.

FIG. 7 is a flowchart of a process for enforcing lockdown or egress ordering by a requesting node during fast invalidation of an exported block of memory, which process might be used with an embodiment of the present invention. The process is complimentary to the process shown in FIG. 6; the two processes are related through the future and present epoch numbers which are part of both processes. As with the process shown in FIG. 6, the process shown in FIG. 7 involves a request to store data on a block of memory, which request might originate in the node that exports the block.

In the first step 701 of the process shown in FIG. 7, the CMM receives data over the bus (e.g., ccHT) from one of the node's CPUs. The CMM goes to step 702 where the data is tagged with the then-current future epoch number created during step 608 of the process shown in FIG. 6. In step 703, the CMM determines whether the tagged value of the then-current future epoch number equals the present epoch number, which was created in step 610 of the process shown in FIG. 6. If not, the CMM does a busy wait until the present epoch number equals the tagged epoch number. Once that occurs, the CMM allows the data to proceed over the network, in step 704. Here data could include any message that is bearing data, including interrupts.

In particular embodiments, lockdown also applies to remote stores, as well as local stores. A remote store occurs when the store request originates from a node that is importing the data to be stored from another node. However, when the store is a remote store, lockdown occurs following (i) the receipt of the first response (e.g., Prb_Rsp2Impt) to the network FI probes, which response will either contain the latest version of the block of memory or an indication that such a version will not be forthcoming, and (ii) the sending of a bus (e.g., ccHT) RdResp, without waiting, for responses from the other network FI probes. Consequently, the conditions for entry into lockdown are similar to steps 603-607 in FIG. 6. Also, in particular embodiments, lockdown applies to load or read requests rather than store or write requests.

Figure 8:
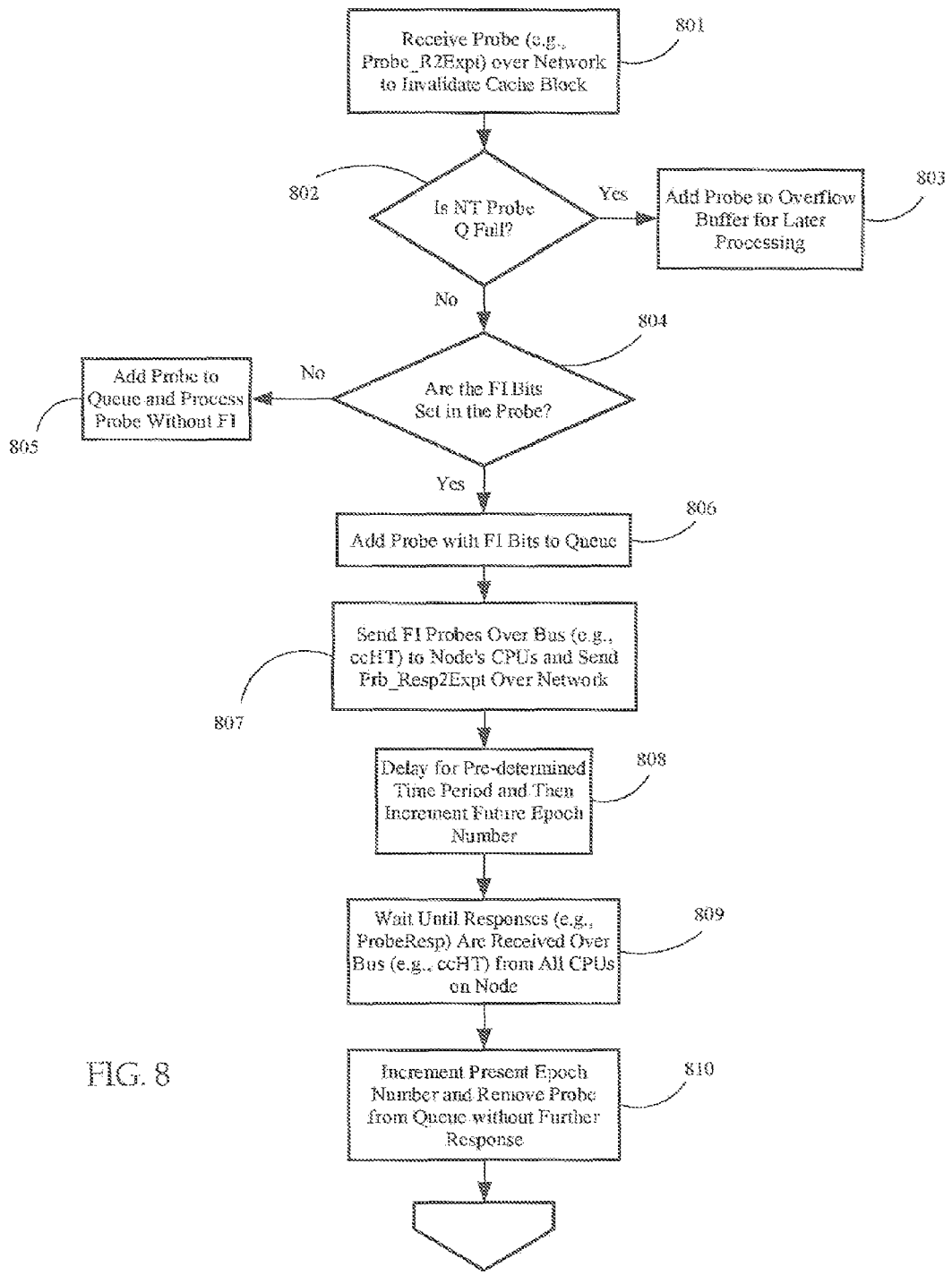
FIG. 8 is a diagram showing a flowchart of an example process for entry into and exit from blocking or ingress ordering by an importing node during fast invalidation of an imported block of memory, which process might be used with an embodiment of the present invention.

FIG. 8 is a flowchart of a process for entry into and exit from blocking or ingress ordering by an importing node during fast invalidation of an imported block of memory, which process might be used with an embodiment of the present invention. The process shown involves a probe to invalidate a cache block, which probe originates from the node that exports the block, although the probe might have also originated with a node that imports the block. The process shown in FIG. 8 is complimentary to the process shown in FIG. 6, insofar as the probe that initiates the FIG. 8 process might be one of the probes issued in step 607 of the FIG. 6 process.

The CMM performs blocking or ingress ordering because data in another node's memory system has moved ahead in time with respect to the importing node's memory system. Consequently, if data from the other node were allowed to "leak" into the importing node's memory system before that memory system requested the data (by processing the FI), there might be a violation of the third sufficient condition for cache coherence as described above.

In the first step 801, the CMM receives a probe (e.g., Probe_R2Expt) over the network to invalidate a cache block. The CMM then determines, in step 802, whether the NT Probe Q is full and, if so, adds the probe to an overflow buffer for later processing, in step 803. Otherwise, if the queue is not full, the CMM goes to step 804 and determines whether the fast invalidation (FI) bits are set in the probe. If not, the CMM adds the probe to the NT Probe Q and processes the probe without FI, in step 805. Otherwise, if the FI bits are set, the CMM goes to step 807 and sends (i) FI probes over the bus (e.g., ccHT) to the node's CPUs, and (ii) a Prb_Rsp2Expt over the network, without waiting for responses from the CPUs. In step 808, the CMM delays for a predetermined time and then increments the value of a future epoch number. Then in step 809, the CMM waits until responses (e.g., ProbeResp) have been received over the bus (e.g., ccHT) from all CPUs in the node and, in step 810, increments the value of the present epoch number and removes the probe from the queue without further response.

In step 808 of the process shown in FIG. 8, there is a delay for a pre-determined time period. This pre-determined time period is based on the time it would take for a Prb_Rsp2Expt to reach another node in the network and for that node to return data. In particular implementations, this is a calculated or observed time period that depends upon factors such as the network's capabilities (e.g., serialization rates, propagation delay, etc.) and requirements and the network's messaging protocol. During this pre-determined time period, there is no blocking with respect to network data entering the bus (e.g., ccHT). In many, if not most, instances, there will be no explicit blocking since responses from the CPUs will be received before the end of the pre-determined time period.

Figure 9:
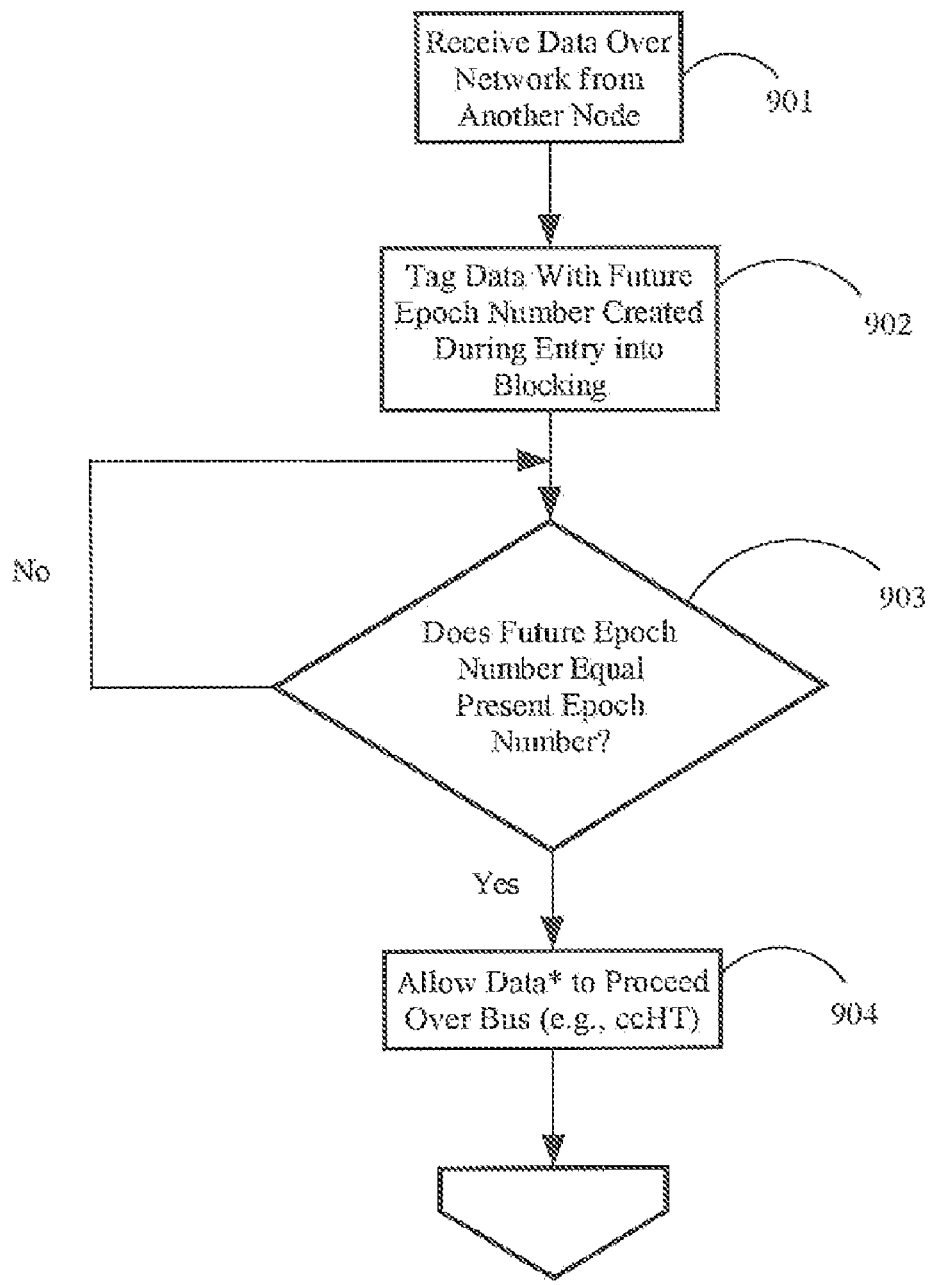
FIG. 9 is a diagram showing a flowchart of an example process for enforcing blocking or ingress ordering by an importing node during fast invalidation of an imported block of memory, which process might be used with an embodiment of the present invention.

FIG. 9 is a flowchart of a process for enforcing blocking or ingress ordering by an importing node during fast invalidation of an imported block of memory, which process might be used with an embodiment of the present invention. The process is complimentary to the process shown in FIG. 8; the two processes are related through the future and present epoch numbers which are part of both processes. As with the process shown in FIG. 8, the process shown in FIG. 9 involves a probe to invalidate a cache block, which probe might originate in the node that exports the block.

In the first step 901 of the process shown in FIG. 9, the CMM receives data over the network from another node. The process goes to step 902 where the data is tagged with the then-current future epoch number created during step 808 of the process shown in FIG. 8. In step 903, the CMM determines whether the tagged value of the then-current future epoch number equals the present epoch number, which was created set in step 810 of the process shown in FIG. 8. If not, the CMM does a busy wait until the present epoch number equals the tagged epoch number. Once that occurs, the CMM allows the data to proceed over the bus (e.g., ccHT), in step 904. Here data could include any message that is bearing data, including interrupts.

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers.

The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many other possible orderings of the steps in the processes described above. Similarly, there are many other possible systems which in cache coherence might be useful, in addition to DSM systems. Here it will be appreciated that processors often use multiple line caches that might benefit from fast invalidation. As a result, the invention is not limited to the specific examples and illustrations discussed above, but only by the following claims and their equivalents.

What is claimed is:

1. A method, comprising:
   receiving, at a distributed memory logic circuit, a request to modify a memory block stored on a computer node that includes the distributed memory logic circuit and one or more CPUs, wherein the request is marked for fast invalidation and comes from one of the CPUs;
   sending probes to a distributed memory logic circuit on one or more other nodes in a computer network, if the memory block is cached on the other nodes, wherein the probes are also marked for fast invalidation,
   responding to the request and allowing the modification to proceed without waiting for responses from the probes;
   delaying for a pre-determined time period after responding to the request and then incrementing the value of a first counter;
   waiting until responses have been received for all of the probes and then incrementing the value of a second counter;
   associating data received from the CPUs with a tag including a current value of the first counter; and
   preventing data from leaving the node based on the value of the associated tag relative to the value of the second counter.

2. The method of claim 1, wherein the pre-determined time period is based on the time it would take for a probe response to reach a CPU in the node and for that CPU to execute a store.

3. The method of claim 1, wherein the nodes are connected into a network by a scalable interconnect that uses a reliable delivery protocol.

4. The method of claim 1, wherein the distributed memory logic circuit is a DSM-management chip.

5. The method of claim 1, wherein the first and second counters are serial counters that are monotonic except in the case of rollover.

6. A method, comprising:
   receiving, at a distributed memory logic circuit, a first probe seeking to invalidate a cached memory block stored on a computer node that includes the distributed memory logic circuit, wherein the first probe is marked for fast invalidation and comes from a distributed memory logic circuit on another node in a computer network;
   sending out additional invalidation probes to one or more CPUs on the node;
   responding to the first probe without waiting for responses from the CPUs;
   delaying for a pre-determined time period and then incrementing the value of a first counter;

waiting until responses have been received for all of the additional invalidation probes and then incrementing the value of a second counter;

associating data received from the network with a tag including a current value of the first counter; and preventing data from going to the CPUs based on the value of the associated tag relative to the value of the second counter.

7. The method of claim 6, wherein the pre-determined time period is based on the time it would take for a probe response to reach another node in the network and for that node to return data.

8. The method of claim 6, wherein the nodes are connected into a network by a scalable interconnect that uses a reliable delivery protocol.

9. The method of claim 6, wherein the distributed memory logic circuit is a DSM-management chip.

10. The method of claim 6, wherein the first and second counters are serial counters that are monotonic except in the case of rollover.

11. An apparatus, comprising logic encoded in one or more persistent media for execution and when executed operable to:

receive, at a distributed memory logic circuit, a request to modify a memory block stored on a computer node that includes the distributed memory logic circuit and one or more CPUs, wherein the request is marked for fast invalidation and comes from one of the CPUs;

send probes to a distributed memory logic circuit on one or more other nodes in a computer network, if the memory block is cached on the other nodes, wherein the probes are also marked for fast invalidation;

respond to the request and allow the modification to proceed without waiting for responses from the probes;

delay for a pre-determined time period and then increment the value of a first counter;

wait until responses have been received for all of the probes and then increment the value of a second counter;

associate data received from the CPUs with a tag including a current value of the first counter; and prevent data from leaving the node based on the value of the associated tag relative to the value of the second counter.

12. The apparatus of claim 11, wherein the pre-determined time period is based on the time it would take for a probe response to reach a CPU in the node and for that CPU to execute a store.

13. The apparatus of claim 11, wherein the nodes are connected into a network by a scalable interconnect that uses a reliable delivery protocol.

14. The apparatus of claim 11, wherein the distributed memory logic circuit is a DSM-management chip.

15. The apparatus of claim 11, wherein the first and second counters are serial counters that are monotonic except in the case of rollover.

16. An apparatus, comprising logic encoded in one or more persistent media for execution and when executed operable to:

receive, at a distributed memory logic circuit, a first probe seeking to invalidate a cached memory block stored on a computer node that includes the distributed memory logic circuit, wherein the first probe is marked for fast invalidation and comes from a distributed memory logic circuit on another node in a computer network;

send out additional invalidation probes to one or more CPUs on the node;

respond to the first probe without waiting for responses from the CPUs;

delay for a pre-determined time period and then increment the value of a first counter;

wait until responses have been received for all of the additional invalidation probes and then increment the value of a second counter;

associate data received from the network with a tag including a current value of the first counter; and prevent data from going to the CPUs based on the value of the associated tag relative to the value of the second counter.

17. The apparatus of claim 16, wherein the pre-determined time period is based on the time it would take for a probe response to reach another node in the network and for that node to return data.

18. The apparatus of claim 16, wherein the nodes are connected into a network by a scalable interconnect that uses a reliable delivery protocol.

19. The apparatus of claim 16, wherein the distributed memory logic circuit is a DSM-management chip.

20. The apparatus of claim 16, wherein the first and second counters are serial counters that are monotonic except in the case of rollover.

* * * * *